United States Patent [19]

Tiffany

[11] Patent Number: 4,681,402
[45] Date of Patent: Jul. 21, 1987

[54] RAINBOW PROJECTOR

[76] Inventor: Carlton R. Tiffany, 225 Hill Rd., Douglassville, Pa. 19518

[21] Appl. No.: 783,091

[22] Filed: Oct. 2, 1985

[51] Int. Cl.⁴ .......................... G02B 5/04; F21V 3/00; F21V 5/00
[52] U.S. Cl. ..................... 350/286; 362/311
[58] Field of Search .............. 350/168, 286, 287; 362/311, 318, 326, 339, 340

[56] References Cited

U.S. PATENT DOCUMENTS

| | | | |
|---|---|---|---|
| 71,309 | 11/1867 | Kane | 350/286 |
| 909,507 | 1/1909 | Zubli | 362/255 |
| 1,090,278 | 3/1914 | Coates | 350/4.1 |
| 1,475,806 | 11/1923 | Elliott | 362/339 |
| 3,306,974 | 2/1967 | Cunnally | 350/286 |
| 3,437,405 | 4/1969 | Northrop | 350/433 |
| 3,924,929 | 12/1975 | Holmen et al. | 350/590 |
| 4,094,084 | 6/1978 | DaMert | 40/613 |
| 4,139,677 | 2/1979 | Blair et al. | 65/66 |
| 4,557,055 | 12/1985 | Arai | 353/81 |

FOREIGN PATENT DOCUMENTS

| | | | |
|---|---|---|---|
| 2354934 | 5/1975 | Fed. Rep. of Germany | 350/287 |
| 558536 | 1/1975 | Switzerland | 350/168 |

Primary Examiner—John K. Corbin
Assistant Examiner—Vincent J. Lemmo
Attorney, Agent, or Firm—Hopgood, Calimafde, Kalil, Blaustein & Judlowe

[57] ABSTRACT

A method and means for projecting a secondary rainbow of natural configuration comprising an arcuate prism of greater than about 180° of arc and optionally an arcuate prism orienting means. The primary and secondary refractive surfaces of arcuate prism are oriented such that they meet along the edge of said arcuate prism closest to that point at the center of said arc. The angle formed by the primary and secondary refractive surfaces of said arcuate prism are from about 25° to about 75°, the "active range". When the prism is of polymethyl methacrylate (such as lucite) the refractive surfaces subtend an angle of greater than about 35° and less than about 65°, the "particular active range". Prisms within the active range provide for the projection of a secondary rainbow of natural configuration when a light course of generally parallel rays of light is oriented at a position from less than about 30° from perpendicular relative to a plane through the interior edge of the prism. Prism materials of high indicies of refraction will project secondary rainbows from a point where incident light forms an angle of less than about 30°. This constitutes the maximum effective angular range.

5 Claims, 6 Drawing Figures

RAINBOW PROJECTOR

BACKGROUND OF THE INVENTION

The present invention relates to a means and method affording the surprising and unexpected result of projecting or duplicating the natural configuration and appearance of a secondary rainbow as found in nature. In nature rainbows arise from generally parallel rays of light striking water droplets in the air. The rays of minimum deviation after two internal reflections within a droplet form a colored arc at an angular distance of 51° from the antisolar point. This arc is known as a secondary rainbow. Red comprises the color of the lower portion of this arc and the colors progress through the spectrum to shorter wavelengths with violet forming the upper visible portion of the arc.

It is commonly known that a prism will separate generally parallel light into constituent colors or bands. Prisms and other reflective ornaments have long been known for the purposes of separating light into component bands and for projecting visual effects.

U.S. Pat. No. 4,094,084 to DaMert ("DaMert") discloses such a prism. However, the DaMert prism can, at best, only produce "colorful spectra" in arcuate fashion. In no orientation will DaMert project a secondary rainbow of natural configuration. U.S. Pat. No. 909,507 to Zubli, U.S. Pat. No. 1,090,278 to Coates and U.S. Pat. No. 3,437,405 to Northrop ("Northrop") do not provide secondary rainbow effects. Northrop column 8, lines 9-14 describes an arc of light. The arc a Northrop, however, is not described as occuring in spectral colors.

It is an object of this invention to provide both a method and means for projecting a secondary rainbow of natural configuration.

It is a further object of this invention to provide a decorative ornament capable of projecting a secondary rainbow.

It is another object of this invention to project a secondary rainbow from an area of sunlight or artifically produced light into an area not directly illuminated by this light source.

SUMMARY OF THE INVENTION

The present invention provides a method and means for projecting a secondary rainbow of natural configuration comprised of a generally arcuate prism of greater than about 180° of arc and optionally an orienting means for said arcuate prism. The arcuate prism comprises both primary and secondary refractive surfaces. The primary and secondary refractive surfaces of the arcuate prism are oriented such that they meet along the edge of the arcuate prism closest to that point at the center of said arc.

The angle formed by the juncture of primary and secondary surfaces of the prism subtend an angle of from about 25° to about 75° (the "active range") depending upon the index of refraction of the prism material. In the preferred embodiment a prism of methyl methacrylate (such as Lucite) requires an angle of from about 35° to about 65° (the "particular active range"). Arcuate prisms within the active range provide for the projection of a secondary rainbow of natural configuration when a light course of generally parallel rays of light is oriented at a position of less than about 30° from perpendicular relative to a plane through the interior edge of the prism. Prism materials of high indicies of refraction will project secondary rainbows from a point where incident light forms an angle of less than about 30°. This angle of less than about 30° constitutes the maximum angular range. The particular angular range for Lucite preferably may be from less than about 20° from perpendicular relative to the plane through the interior edge of the prism and most preferably from about 10° to about perpendicular. An angular range closest to about 0° generally gives the best results. The projected secondary rainbow is formed on any projection matter such as a wall or even suspended droplets or smoke.

A number of materials are listed in Table I. These materials are exemplary, without limitation, of the transparent materials useful for prisms in the instant invention. Each material is listed with its index of refraction and approximate angular range within which arcuate prisms for projecting secondary rainbows may be fashioned.

TABLE I

| Material | N (Index of Refraction) | Maximum Angle of Refraction | Active Range Approx Min. | Active Range Approx Max. |
|---|---|---|---|---|
| cellulose nitrate | 1.54 | 81° | 30° | 60° |
| crown glass | 1.52 | 82° | 30° | 60° |
| epoxy resin | 1.55-1.60 | 80°-77° | 25° | 60° |
| flint glass | 1.61 | 77° | 25° | 55° |
| ice | 1.31 | 100° | 50° | 75° |
| polyester resin (c.a. 50% stryene) | 1.52 | 82° | 30° | 60° |
| polyethylene | 1.51 | 83° | 35° | 65° |
| polymethyl methacrylate | 1.49 | 84° | 35° | 65° |
| polypropylene | 1.47 | 86° | 35° | 65° |
| polystyrene | 1.59 | 80° | 30° | 60° |
| polyurethane | 1.50 | 84° | 35° | 65° |
| polyvinyl acetate | 1.47 | 86° | 35° | 65° |
| polyvinylchloride | 1.54 | 81° | 30° | 60° |
| urea formaldehyde resin | 1.54 | 81° | 30° | 60° |

Index of refraction data, *Polymer Handbook*, Bandrup J. (John Wiley & Sons, Inc. 1975).

The prism may be oriented by an orientation means such as a stand. The orientation means being both stable and adjustable permits establishing and maintaining the correct positional relationship of prism means, light source and secondary rainbow. Motorized orientation means may be provided to track a moving light source, such as the sun, providing for the continuous projection of a secondary rainbow.

DETAILED DESCRIPTION OF THE INVENTION

Figure 1:
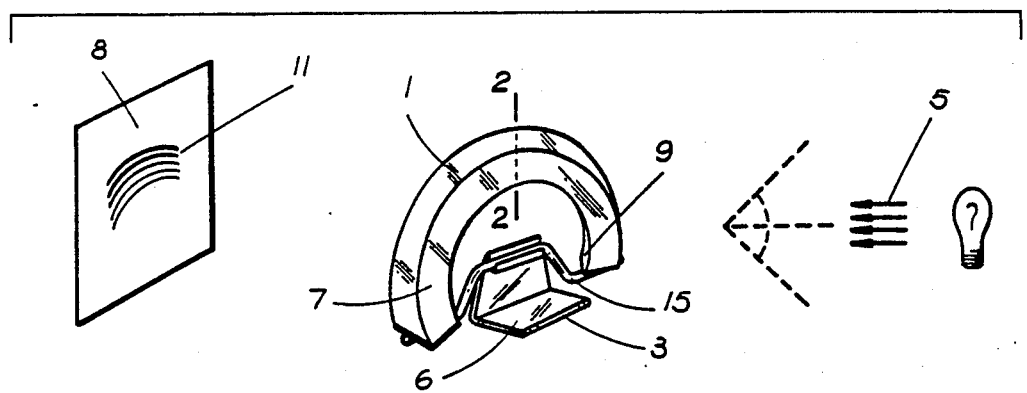
FIG. 1 depicts the preferred embodiment of prism, orientation means and light source orientation for projecting a secondary rainbow of natural configuration.

FIG. 1 is a perspective view of the arcuate prism means 1 and the orientating means 3 for said arcuate prism. Generally parallel rays of light 5 from any light source are seen to be directed toward primary refractive surface 7 and exiting from secondary refractive surface 9 to form a projection of a secondary rainbow 11 on projection material 8. Arcuate prism means 1 is seen to subtend an arc of greater than about 180°. The maximum effective angular range of incidence of entry light is seen to be less than about 30° relative to plane through the interior edge of the prism.

Orienting means 3 is seen to comprise positioning bar 15 rotably mounted in base means 6.

Other orienting means are easily imagined by those skilled in the art. Such means may be generally rigid and immovable to yield the same effect in all conditions of constant light relative to the prism or adjustable but stable for situations where the light will be variously placed relative to the prism. Such orienting means preferably will not greatly interfer with the entry or exit of light from the prism by significantly occluding the light path, thus maintaining generally full transmittability of light in the effective angular range from the primary refractive surface through the secondary refractive surface to the projection material.

Figure 2:
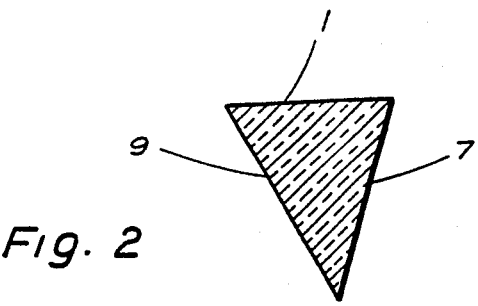
FIG. 2 depicts the prism in cross section at line 2—2.

FIG. 2 shows a cross sectional view of the arcuate prism means at line 2—2. The primary refractive surface 7 and secondary refractive surface 9 are shown here to subtend an angle of about 75°. About 25° is indicated to show the minimum limit of the active range.

Figure 3:
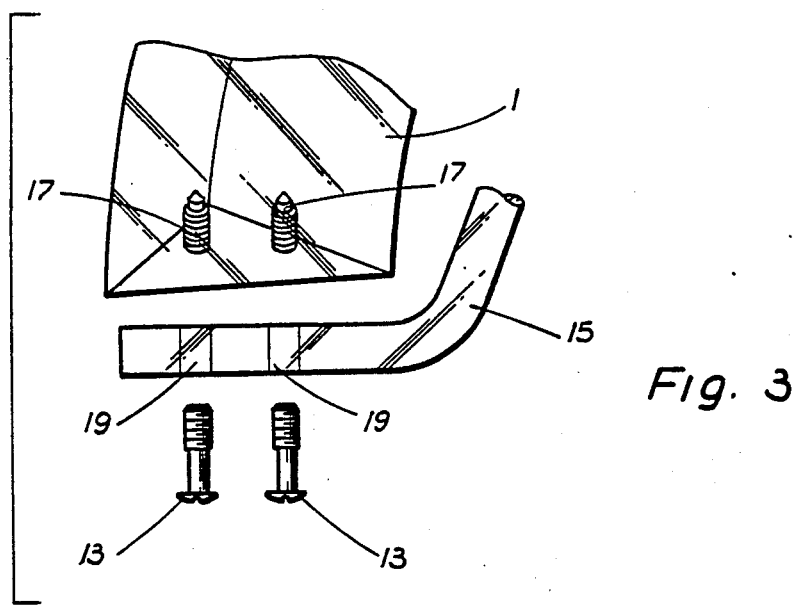
FIG. 3 is an exploded view of the preferred means of affixing orientation means to the arcuate prism.

FIG. 3 shows an exploded detailed view of the preferred means of affixing the orientating means to the arcuate prism means showing affixing members 13 here shown as screws insertable through apertures 19 in positioning bar 15 insertable into receiver holes 17 in prism 1. In another embodiment, the prism may be glued to an orientating means.

The prism here shown is of polymethy methyacrylate, a clear resin also known as Lucite. Any other generally transparent materials may be used such as other plastics, glass and fluids contained in generally transparent receptacles of appropriate refraction characteristics. These materials may be tinted and still be within the present prism means. Projection of the secondary rainbow will be a duplicate of that rainbow as found in nature and hence of natural configuration with red in the interior progressing to blue.

Figure 4:
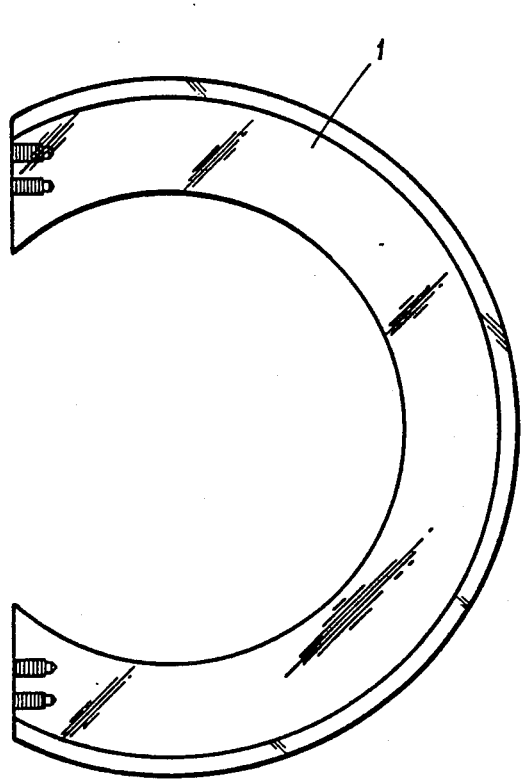
FIG. 4 is the most preferred embodiment.

FIG. 4 is the most preferred embodiment. The prism is of polymethyl methacrylate (Lucite). The arcuate prism is seen to have an interior diameter of about 9" and an exterior diameter of about 14".

Figure 5:
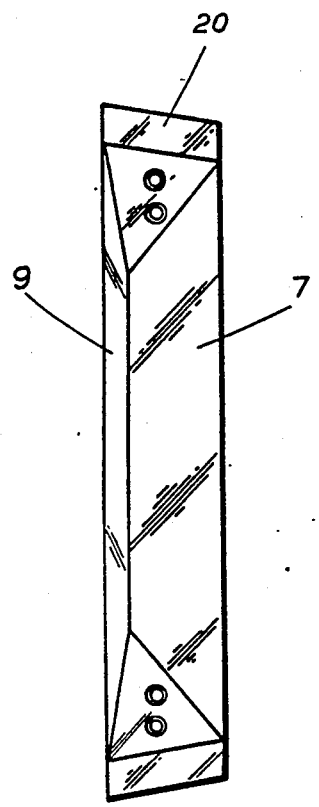
FIG. 5 is the most preferred embodiment in cross section.

FIG. 5 shows the most preferred embodiment in cross section. Angle $\theta$ is about 45°. The primary refractive surface 7 at the exterior edge forms an angle of 62° with the exterior surface 20 of the prism and the secondary refractive surface forms an angle of 73° with the exterior surface 20 of the prism. The edge comprising the secondary refractive surface 9 is seen to lie canted at an angle of 5° from perpendicular relative to a plane from the interior edge of the arcuate prism.

Figure 6:
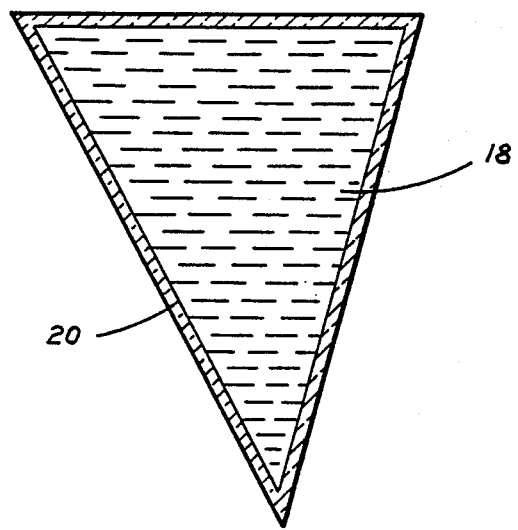
FIG. 6 is a fluid filled prism in cross section.

FIG. 6 shows a fluid filled prism in cross section the fluid 18 contained in the generally transparent receptacle 20.

Projection may be accomplished by directing the light rays exiting the prism onto any projection material such as a screen or a fine mist of suspended water droplets, smoke or the like. To be fully able to duplicate a natural secondary rainbow, the arcuate prism should subtend at least about 180° of arc.

It is not necessary that the arcuate prism be perfectly disposed about a central point as some deviation into a parabola or other shape is acceptable. The prism need only be generally arcuate.

In will be understood by those skilled in the art that it is not intended to limit the invention to those embodiments described. On the contrary, it is intended to cover all alternatives, modifications and equivalents as may be included within the spirit and scope of the invention. For example, a prism might not require an orienting means if set on a flat surface with an appropriate light source. The invention will be limited solely by the claims.

What I claim is:

1. A means for projecting a secondary rainbow of natural configuration comprising a generally arcuate prism means of at least about 180° of arc bearing a primary and secondary refractive surface wherein such surfaces meet along that single interior edge of said prism closest to the center of the arc of the prism and said primary and secondary surfaces form an active range angle from about 25° to about 75°, such that when a light source positioned at an effective angular range of less than about 30° from perpendicular relative to a plane through the interior edge of the prism, a secondary rainbow of natural configuration will be projected from the secondary refractive surface, said projecting means further comprising an orienting means attached thereto while maintaining generally full transmitability of light in the effective angular range from the primary refractive surface through the secondary refractive surface to projection material, wherein the orienting means is further comprised of a positioning means and a base means wherein the positioning means is a bar affixed at each end of said arcuate prism and said positioning bar is rotably orientable upon said base means.

2. The prism means of claim 1 wherein the prism is of transparent materials selected from the group comprising plastic, glass, and fluid filled generally transparent containers.

3. The prism means of claim 2 wherein the prism is polymethyl methacrylate.

4. The prism means of claim 3 wherein the primary and secondary refractive surface form an angle of from about 35° to about 65° such that when a light source is positioned at less than about 20° from perpendicular relative to a plane through the interior edge of the prism a secondary rainbow of natural configuration will be projected from the secondary refractive surface.

5. The prism means of claim 4 wherein the arcuate prism has interior diameter of about 9 inches and an exterior diameter of about 14 inches and the active range angle is about 45°, and the secondary surface is canted at about 5° from perpendicular relative to a plane through the interior edge of the arcuate prism, and wherein effective angular range is from about 10° to about perpendicular.

* * * * *